(12) United States Patent
Jowett et al.

(10) Patent No.: US 10,749,730 B2
(45) Date of Patent: *Aug. 18, 2020

(54) SUPPLYING APPLICATIONS TO MOBILE DEVICES

(71) Applicant: OPEN TEXT SA ULC, Halifax (CA)

(72) Inventors: Frederick Haigh Jowett, London (GB); Robert Jeffrey Noble, St. Albans (GB)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,361

(22) Filed: Feb. 5, 2019

(65) Prior Publication Data

US 2019/0173732 A1 Jun. 6, 2019

Related U.S. Application Data

(63) Continuation of application No. 14/017,110, filed on Sep. 3, 2013, now Pat. No. 10,250,432, which is a
(Continued)

(30) Foreign Application Priority Data

Jun. 9, 2007 (GB) .................................. 0711186.7

(51) Int. Cl.
*G06F 15/16* (2006.01)
*H04L 29/06* (2006.01)
(Continued)

(52) U.S. Cl.
CPC .......... *H04L 29/06047* (2013.01); *G06F 8/38* (2013.01); *G06F 8/61* (2013.01); *H04L 67/42* (2013.01)

(58) Field of Classification Search
CPC ..... H04L 29/06047; H04L 67/42; G06F 8/38; G06F 8/61
See application file for complete search history.

(56) References Cited

U.S. PATENT DOCUMENTS 6,023,714 A  2/2000 Hill et al.
7,013,329 B1 * 3/2006 Paul .................. H04M 3/42178
                                                      709/217
(Continued)

FOREIGN PATENT DOCUMENTS

EP  0415843  3/1991
EP  0454364  10/1991
(Continued)

OTHER PUBLICATIONS

Office Action issued for U.S. Appl. No. 12/135,432, dated Dec. 23, 2009, 10 pages.
(Continued)

*Primary Examiner* — Oleg Survillo
(74) *Attorney, Agent, or Firm* — Sprinkle IP Law Group

(57) ABSTRACT

Applications are supplied to mobile devices. An application template is developed as a hierarchy of nested elements and layout data for a plurality of types of element. An application is generated by applying content data to one or more of the elements to form objects. The objects are supplied to a requesting mobile device, such that each object contains data, an identification of its position within the hierarchy and an identification of its element type. In addition, layout data is supplied to the mobile device for element types corresponding to the supplied object.

21 Claims, 18 Drawing Sheets

Related U.S. Application Data continuation of application No. 12/135,432, filed on Jun. 9, 2008, now Pat. No. 8,671,147.

(51) Int. Cl.
*G06F 8/38* (2018.01)
*G06F 8/61* (2018.01)

(56) References Cited

U.S. PATENT DOCUMENTS

| | | | |
|---|---|---|---|
| 7,051,080 B1 * | 5/2006 | Paul | H04L 67/303 709/217 |
| 8,671,147 B2 | 3/2014 | Jowett et al. | |
| 9,195,523 B2 | 11/2015 | Mukundan | |
| 2001/0032269 A1 | 10/2001 | Wilson | |
| 2002/0049702 A1 | 4/2002 | Aizikowitz | |
| 2003/0014442 A1 * | 1/2003 | Shiigi | G06F 8/20 715/255 |
| 2003/0121004 A1 | 6/2003 | Christensen et al. | |
| 2003/0184585 A1 | 10/2003 | Lin et al. | |
| 2004/0024899 A1 | 2/2004 | Sturrock et al. | |
| 2004/0117749 A1 | 6/2004 | Lalonde | |
| 2004/0123238 A1 * | 6/2004 | Hefetz | G06F 9/451 715/234 |
| 2004/0267813 A1 | 12/2004 | Rivers-moore et al. | |
| 2006/0242563 A1 | 10/2006 | Liu et al. | |
| 2007/0106935 A1 | 5/2007 | Su et al. | |
| 2007/0174424 A1 * | 7/2007 | Chen | G06F 9/44526 709/217 |
| 2007/0220419 A1 | 9/2007 | Stibel et al. | |
| 2008/0098291 A1 | 4/2008 | Bradley et al. | |
| 2008/0120538 A1 | 5/2008 | Kurz et al. | |
| 2008/0244422 A1 | 10/2008 | Hilgers et al. | |
| 2008/0288515 A1 | 11/2008 | Kim et al. | |
| 2008/0307047 A1 | 12/2008 | Jowett | |
| 2008/0320396 A1 | 12/2008 | Mizrachi et al. | |
| 2009/0044103 A1 | 2/2009 | Chalecki et al. | |
| 2009/0157657 A1 | 6/2009 | Kim et al. | |
| 2009/0235187 A1 * | 9/2009 | Kim | G06Q 10/06 715/760 |
| 2010/0138809 A1 | 6/2010 | Shenfield et al. | |
| 2010/0174974 A1 | 7/2010 | Brisebois et al. | |
| 2014/0032653 A1 | 1/2014 | Jowett et al. | |

FOREIGN PATENT DOCUMENTS

| | | |
|---|---|---|
| EP | 1235392 | 8/2002 |
| EP | 1363427 | 11/2003 |
| EP | 1453338 | 9/2004 |
| EP | 1569095 | 8/2005 |
| EP | 2000907 | 12/2008 |
| GB | 2420887 | 6/2006 |
| GB | 2449944 A | 12/2008 |
| GB | 2449944 B | 8/2012 |
| JP | 03-131143 | 6/1991 |
| WO | WO0122645 | 3/2001 |
| WO | WO03019838 | 3/2003 |
| WO | WO03041345 | 5/2003 |
| WO | WO03067427 | 8/2003 |
| WO | WO04015955 | 2/2004 |

OTHER PUBLICATIONS

Office Action issued for U.S. Appl. No. 12/135,432, dated Jun. 25, 2010, 13 pages.
Final Office Action issued for U.S. Appl. No. 12/135,432, dated May 31, 2012, 12 pages.
Examination Report issued for British Patent Application No. GB0711186.7, dated Jul. 18, 2011, 4 pages.
Examination Report issued for British Patent Application No. GB0711186.7, dated Jan. 13, 2012, 5 pages.
Examination Report issued for British Patent Application No. GB0711186.7, dated May 28, 2012, 2 pages.
Extended European Search Report issued for European Patent Application No. 08 251 927.3, dated Jul. 7, 2009, 7 pages.
Examination Report issued for European Patent Application No. 08 251 927.3, dated Feb. 24, 2010, 1 page.
Examination Report issued for European Patent Application No. 08 251 927.3, dated Feb. 9, 2012, 4 pages.
Notification of Grant issued for British Patent Application No. GB0711186.7, dated Jul. 10, 2012, 2 pages.
Office Action issued for U.S. Appl. No. 12/135,432, filed Jan. 14, 2013, 10 pages.
Notice of Allowance issued for U.S. Appl. No. 12/135,432, dated May 22, 2013, 13 pages.
Examination Report issued for European Patent Application No. 08 251 927.3, dated Oct. 14, 2013, 7 pages.
Examination Report issued for European Patent Application No. 08251927.3, dated Apr. 1, 2015, 8 pages.
Summons to Attend Oral Proceedings Pursuant to Rule 115(1) EPC issued for European Patent Application No. 08251927.3, dated Nov. 17, 2016, 8 pages.
Office Action for U.S. Appl. No. 14/017,110, dated May 31, 2017, 10 pages.
Office Action for U.S. Appl. No. 14/017,110, dated Dec. 14, 2017, 13 pages.
Office Action for U.S. Appl. No. 14/017,110, dated Jun. 5, 2018, 7 pages.
Notice of Allowance for U.S. Appl. No. 14/017,110, dated Nov. 7, 2018, 6 pages.

* cited by examiner

SUPPLYING APPLICATIONS TO MOBILE DEVICES

CROSS-REFERENCE TO RELATED APPLICATIONS

This application is a continuation of, and claims a benefit of priority under 35 U.S.C. 120 of the filing date of U.S. patent application Ser. No. 14/017,110, filed Sep. 3, 2013, issued as U.S. Pat. No. 10,250,432 entitled "SUPPLYING APPLICATIONS TO MOBILE DEVICES," which is a continuation of, and claims a benefit of priority under 35 U.S.C. 120 of the filing date of U.S. patent application Ser. No. 12/135,432, filed Jun. 9, 2008, entitled "SUPPLYING APPLICATIONS TO MOBILE DEVICES," which claims priority from British Patent Application No. GB0711186.7, filed Jun. 9, 2007, now British Patent No. GB2449944, issued Jul. 12, 2012. The entire contents of applications listed in this paragraph are hereby expressly incorporated by reference for all purposes.

TECHNICAL FIELD

The present invention relates to supplying applications to mobile devices.

BACKGROUND OF THE INVENTION

Over recent years, mobile devices such as mobile telephones and wireless connected personal digital systems, etc. have become widely used, with increasing processing capabilities and larger amounts of data storage. It has therefore become possible for applications to be executed on these devices, either in the form of passive web pages or in the form of more active applications having dynamic content and receiving input from users.

The wireless application protocol (WAP) allows content originally generated for Internet browsers to be transmitted and displayed at wireless devices. Although the capabilities of wireless devices have increased, desktop browsers will continue to provide higher levels of functionality and display substantially more data than it is possible to display on a mobile device. Thus, it is appreciated that most applications served using the WAP approach appear less than ideal when viewed on the mobile device.

As an alternative approach, it is possible to develop bespoke applications for distribution and use on mobile devices. While this provides an attractive option for high-end applications that generate substantial revenues, for many other applications the cost of generating bespoke code cannot be justified within the commercial environment. Consequently, a problem exists in terms of providing high quality mobile applications at a relatively modest cost.

BRIEF SUMMARY OF THE INVENTION

According to an aspect of the present invention, there is provided a method of supplying applications to mobile devices, comprising the steps of developing an application template as a hierarchy of nested elements and layout data for a plurality of types of element, generating an application by applying content data to one or more of the elements to form objects, supplying the objects to a requesting mobile device, wherein each object contains data, an identification of its position within the hierarchy and an identification of its element type, and supplying layout data to the mobile device for element types corresponding to supplied objects. In a preferred embodiment, the mobile devices are mobile telephones.

DESCRIPTION OF THE BEST MODE FOR CARRYING OUT THE INVENTION

FIG. 1

Figure 1:
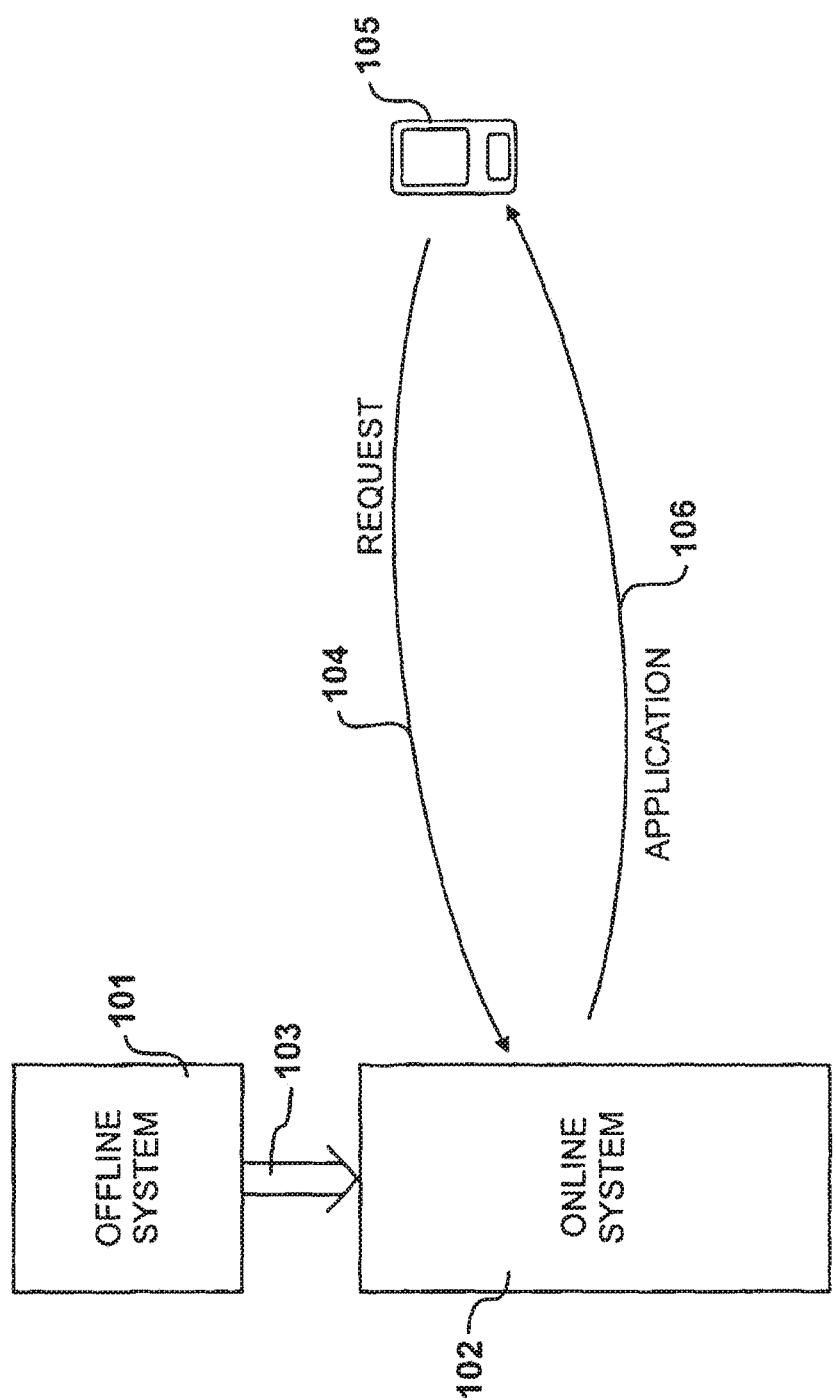
FIG. 1 illustrates an environment for the supplying of applications to mobile devices.

An environment for the supplying of applications to mobile devices is illustrated in FIG. 1. At an offline system 101 applications for mobile devices are developed. These applications provide data to browsing mobile devices in a form that is compatible with the attributes of the mobile devices. The present applicant has appreciated that a demand exists for high quality mobile applications that can be developed at a modest cost. The preferred embodiment therefore represents an efficient procedure for the development of mobile applications. Consequently, it is anticipated that these applications would appear relatively user-friendly to mobile users and thereby increase the frequency with which the applications are invoked, thereby often increasing provider revenue. Having developed the mobile applications at the offline system, the applications themselves are conveyed to an online system 102, as illustrated by arrow 103. At the online system 102 a request (represented by channel 104) is conveyed from a mobile device 105 to the online system. At the online system 102 the application is assembled and then returned back to the mobile device 105, as represented by channel 106. In the preferred embodiment, the assembling process takes place at the online system 102 fundamentally for two reasons. Firstly, the particular data being conveyed may be undergoing an updating process on a regular basis. Thus, for example, an application may be providing current news stories and clearly these will change over the course of a day. Secondly, it is also appreciated that the many of the mobile devices will have different operating characteristics and as such the application supplied to them must be configured so as to optimize the available functionality. Thus, for example, it would be undesirable to provide all applications in a substantially similar fashion, satisfying only the requirements of the lowest common denominator.

FIG. 2

Figure 2:
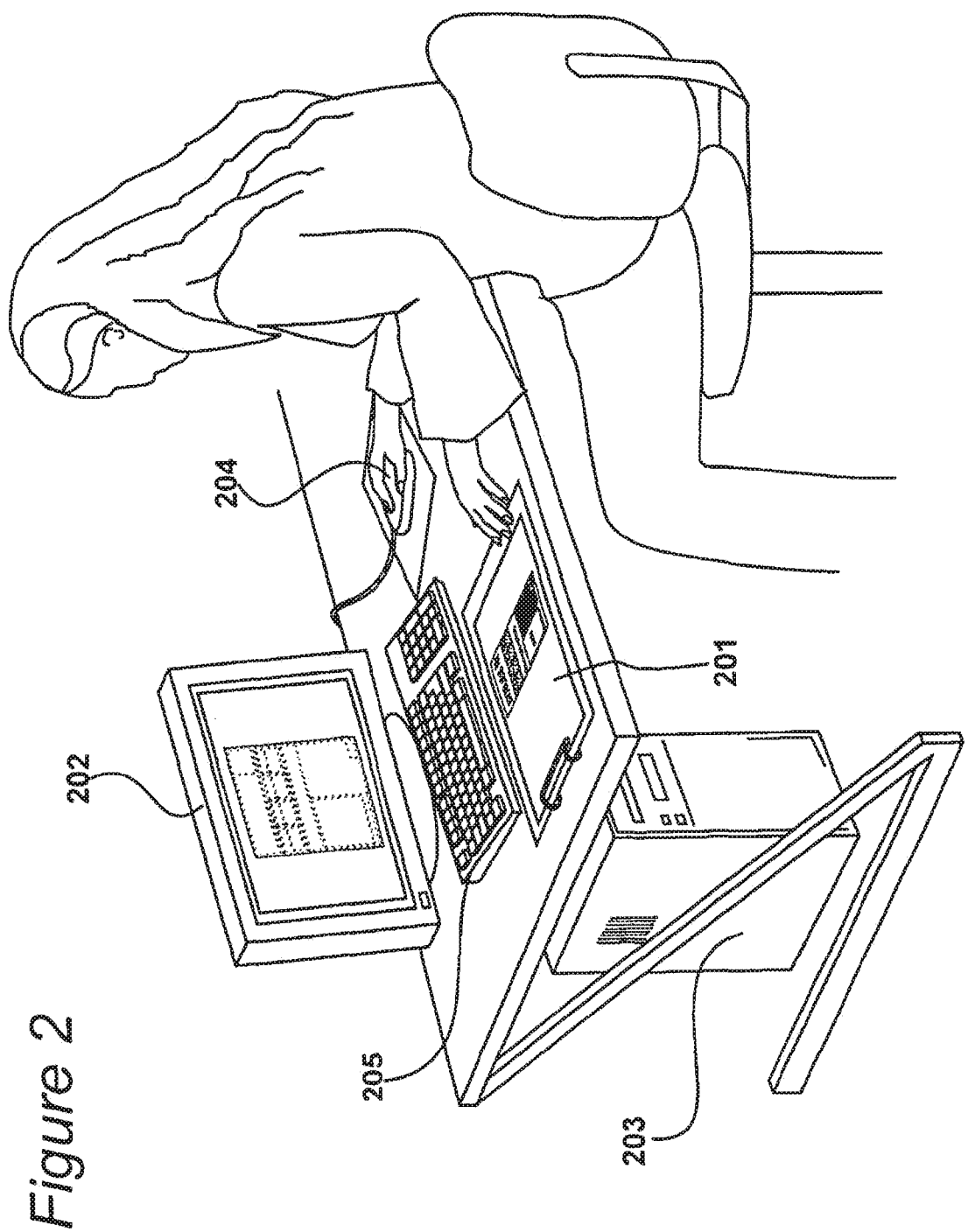
FIG. 2 illustrates a workstation at an offline system shown in FIG. 1.

A workstation at offline system 101 is illustrated in FIG. 2. An operative refers to a plan 201 of how the application is proposed to look when viewed on a mobile device. The present preferred embodiment provides a WYSIWYG environment in which it is possible for the operative to construct the application, in accordance with the plan 201. As the application is developed it is viewed on a display unit 202. Display unit receives video input signals from a computer system 203, executing code in accordance with the present embodiment. Input signals to the processing system 203 are received from a mouse 204 and a keyboard 205.

FIG. 3

The programmed environment of the present preferred embodiment provides for the development of an application template 301 defined as a hierarchy of nested elements. At its highest level, there is provided a page container 302. Further elements may be nested within the page container and the nested container may itself contain further nested containers. This nesting process may continue until a final level of nesting is reached and a particular type of element is selected, referred to herein as an block, notifying the process to the effect that no further degrees of nesting are to occur. The final level of nesting would then contain slots (although slots may exist in other containers) in to which specific items of data, text and graphics, etc. are then subsequently inserted.

Thus, for example, page container 302 contains containers 303 and 304 and block 305. Block contains slots 306 and 307. Container 303 contains four blocks 308, 309, 310 and 311, each of which contains two slots, such as slots 312 and 313 contained in atomic block 308. Container 304 contains blocks 314 and 315 and slots 316 and 317, and block 314 contains slots 318 and 319.

Each element has a layout associated with it. Thus, for example, page container 302 has a vertical flow layout, meaning that atomic block 305, container 303 and container 304 are vertically adjacent to each other. The sizes of the block and containers are specified, either in absolute values or relative values. Container 305 has a horizontal flow layout, meaning that the slots 306 and 307 are horizontally adjacent. Each of the atomic blocks 308 to 311 has the same vertical flow layout. Layouts can also be specified as tables, such as container 304, and in other ways. Each element also has a style associated with it. Thus, although atomic blocks 308 to 311 appear to have the same layout, they may use different colors, fonts and so on. The combination of layout and style is called the element type.

Figure 3:
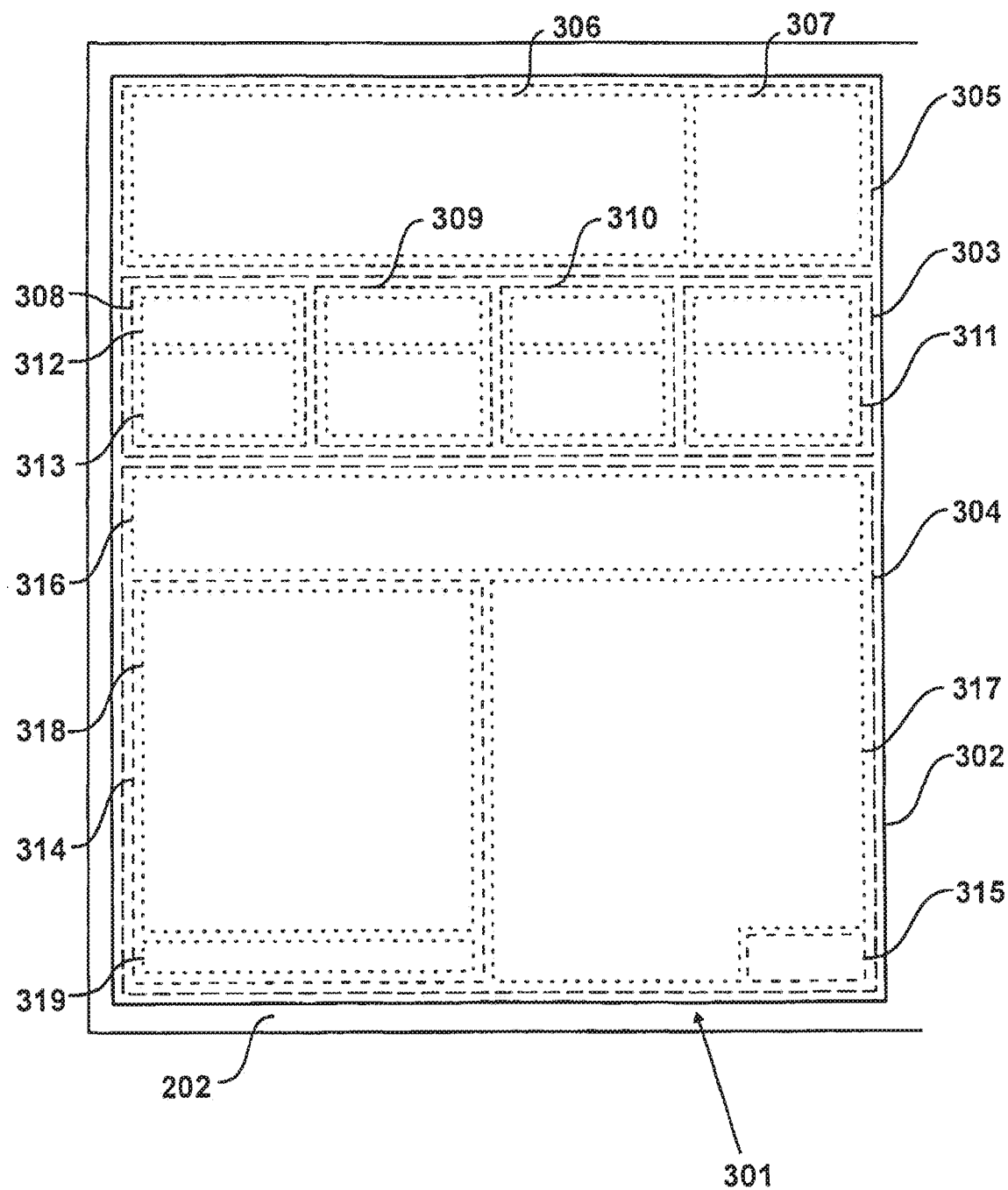
FIG. 3 illustrates an application in development at the workstation shown in FIG. 2.

The operative may produce many pages within the application, each having nested elements as shown in FIG. 3. Having assembled the nested elements within the WYSIWYG environment, an operation is selected to confirm that the development process is complete and as such the system compiles an application template.

FIG. 4

Figure 4:
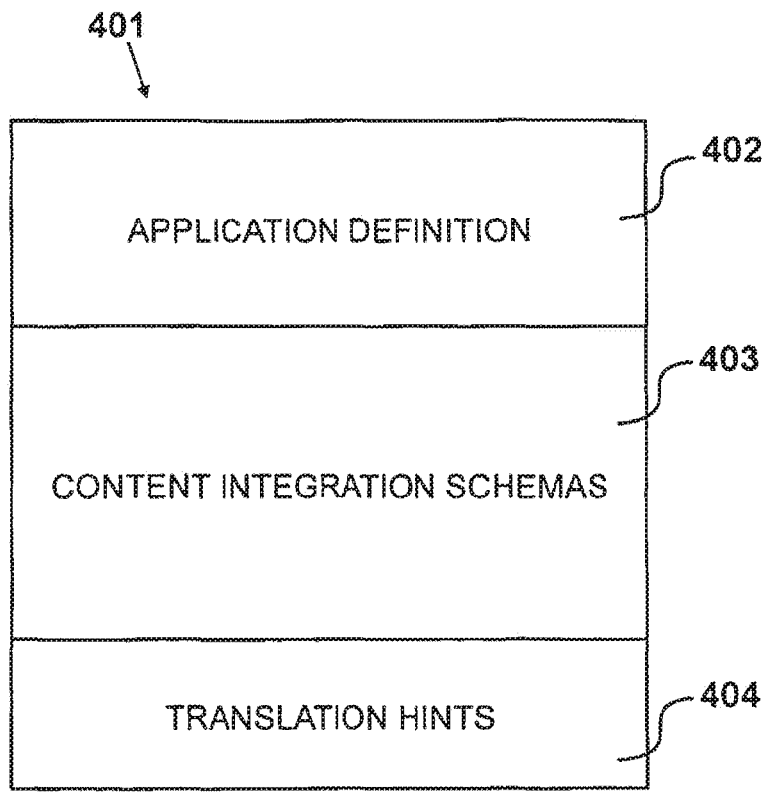
FIG. 4 shows an application template.

This application template is shown in FIG. 4. The template 401 includes three parts, the application definition 402, content integration schemas 403 and translation hints 404.

Application definition 402 includes, for each page in the application, layout data for each of the container types used, indicating each type's layout and styles. Thus, for example, the atomic blocks 308 and 309 may each be of the same type and similarly blocks 310 and 311 may also be of the same types. This means that the same layouts and styles will be applied to them. Container types may also be repeated across pages in the application, as for example a container having the same type as container 305 may appear at the top of every page, although it may contain different information. Further, if any text or graphics never changes it may be hardwired in to the application definition. For example, the definition of the container type of container 305 may indicate that the same image is always to appear in slot 307.

Similarly, there is a content integration schema 403 generated for each of the pages in the application. Each of the containers and slots within the application are named to allow the easy development of the application. Each of schemas 403 is an XML content schema to which any XML document for use within the application must conform. For each container and slot, it identifies the element type as a page container, a nested container, a block or a slot and also sets constraints on it, for example the number of times it may occur. It also specifies elements that may be contained within it, although these do not have to occur in a conforming XML document. The schema for a page may include different information depending on whether the display is portrait or landscape or constrained in some other way.

Translation hints 404 provide a bridge between the application definition 402 and the content integration schemas 403. For example, application definition 402 may indicate that block 305 contains slot0 and slot1 in a horizontal flow. However, XML document and content integration schema 403 for that page will refer to these slots by name, for example as "bannername" and "bannerimage" respectively. Translation hints 404 will indicate that when "bannername" occurs in this block in this page it is in fact slot0, and so on. Although the entire application could be compiled as container0, container1, block0, slot9 and so on, thus removing the need for translation hints 404, this would make it very user-unfriendly and it would be difficult to produce conforming XML documents.

FIG. 5

Figure 5:
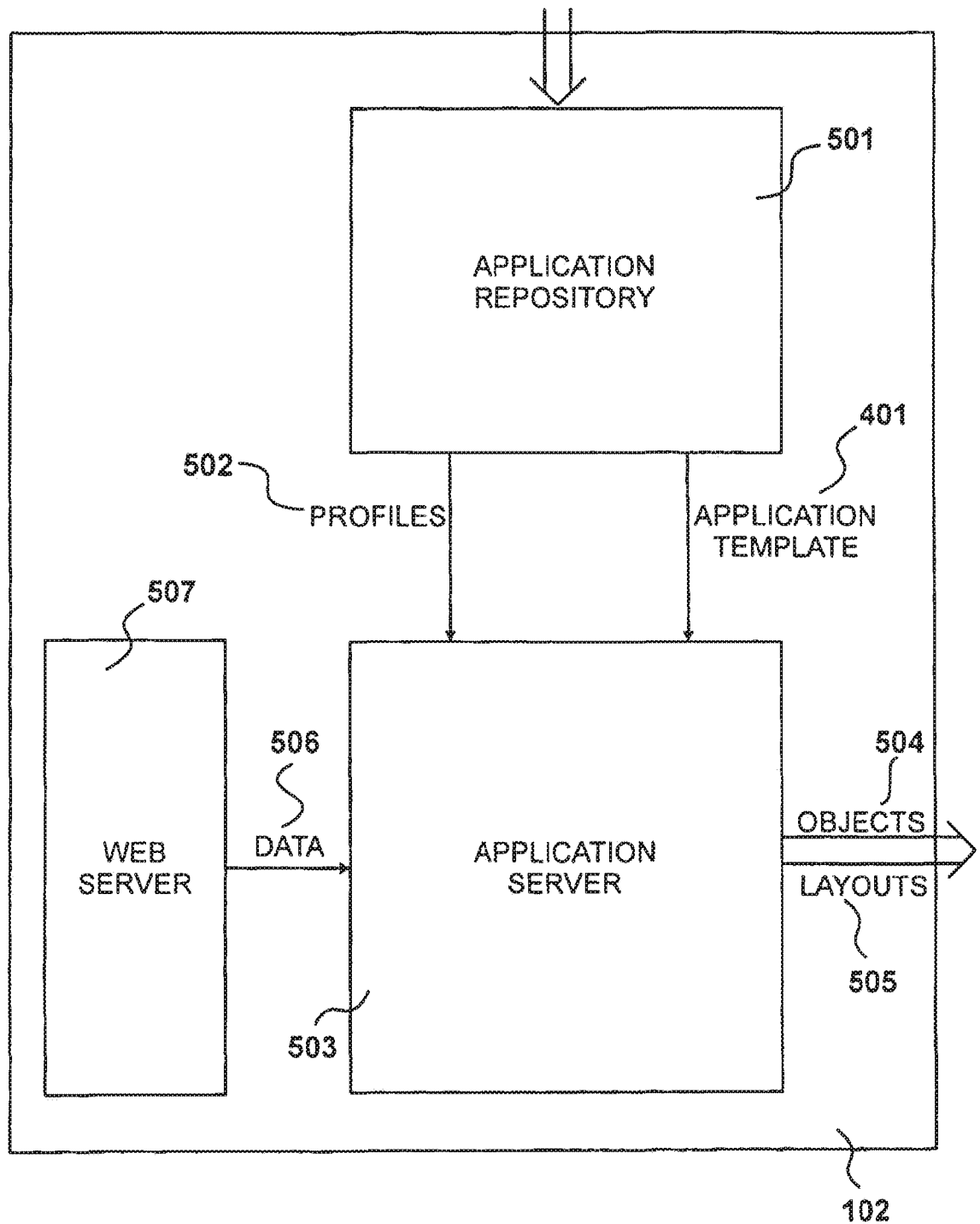
FIG. 5 details the online system shown in FIG. 1.

The online system 102 is further detailed in FIG. 5. The application template 401 resides within application repository 501. This also stores user and device profiles for the users of online system 102. The device profiles indicate, in particular, the capabilities of a device such as mobile device 105, for example the resolution of its screen, whether it is portrait or landscape, its processing ability and so on.

Application server 503 provides requesting devices with applications, which are supplied in the form of objects 504 and layouts 505. Each object corresponds to an element within a page, and each layout corresponds to the layout of that element type as contained in application definition 402. The layout for each type is sent only once and a mobile device 105 will cache these for reuse.

Content data 506 is provided to application server 503 by, in this example, a web server 507.

Any server capable of providing the required data can be used. Data 506 is provided in the form of an XML document that conforms to the content integration schemas 403 for that application. These documents can be produced in an automated way from raw data by an XML generator. Naming the elements of the application makes it much easier for a programmer to develop this converter when given the content integration schemas 403.

Upon receipt of a request 104 from a mobile device 105, the application server retrieves the relevant profiles 502 and application template 401 from application repository 501. On a page-by-page basis, it retrieves data 506 from web server 507. It combines the data with the application template, modified by the profiles, to produce the application 106 that is sent to device 105 in the form of objects 504 and layouts 505.

FIG. 6

Figure 6:
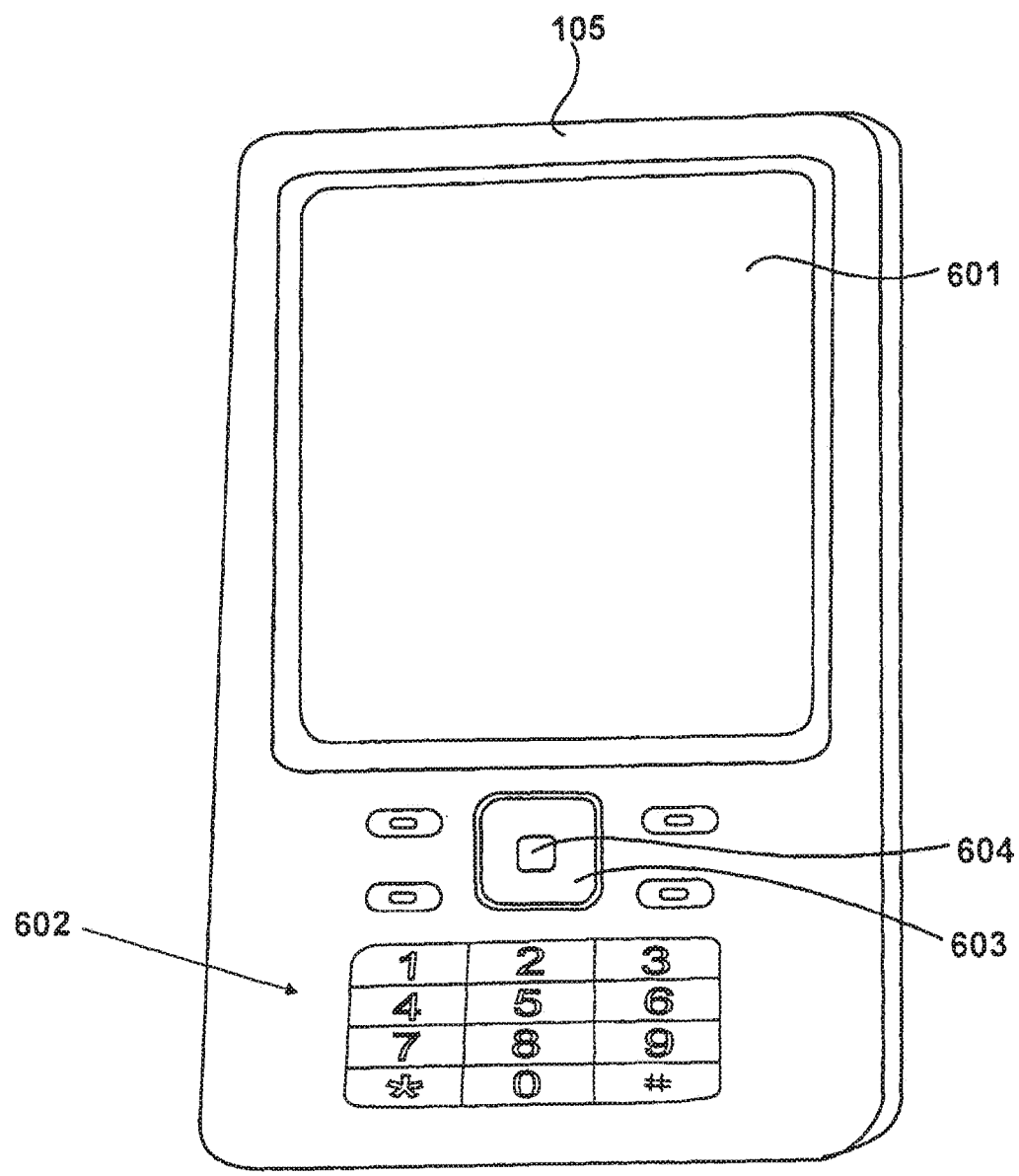
FIG. 6 illustrates a mobile device shown in FIG. 1.

FIG. 6 shows mobile device 105, which in this example is a personal digital assistant (PDA). It has a screen 601 and input buttons 602, such as navigation buttons 603. The navigation buttons allow up, down, left and right movement through an application and provide considerably less functionality than the mouse which would typically be used with a standard webpage displayed on a computer. When an application is displayed on screen 601, the navigation buttons 603 are used to move from element to element. The way in which the movement proceeds is defined at the development stage, but typically the user may move to a container and then drill down within that container until he reaches a block, which is the smallest element that can receive focus. Slots cannot receive focus. Thus a block, in addition to containing data, may also provide an action which can be accessed by pressing the enter or select button 604. The action may be a link to another page, which would result in device 105 sending another request for a page to online system 102, or some other kind of action such as send an SMS or email message, update user details, make a transaction such as a purchase, exit the application and so on.

Given the limited maneuvering capability of navigation buttons 603, the nesting of the elements of an application provides a much easier way to move about, so that the user does not have to go through every element on the page to reach the desired one, but can move through the higher-level containers first before drilling down to the required element in order to perform an action.

FIG. 7

Figure 7:
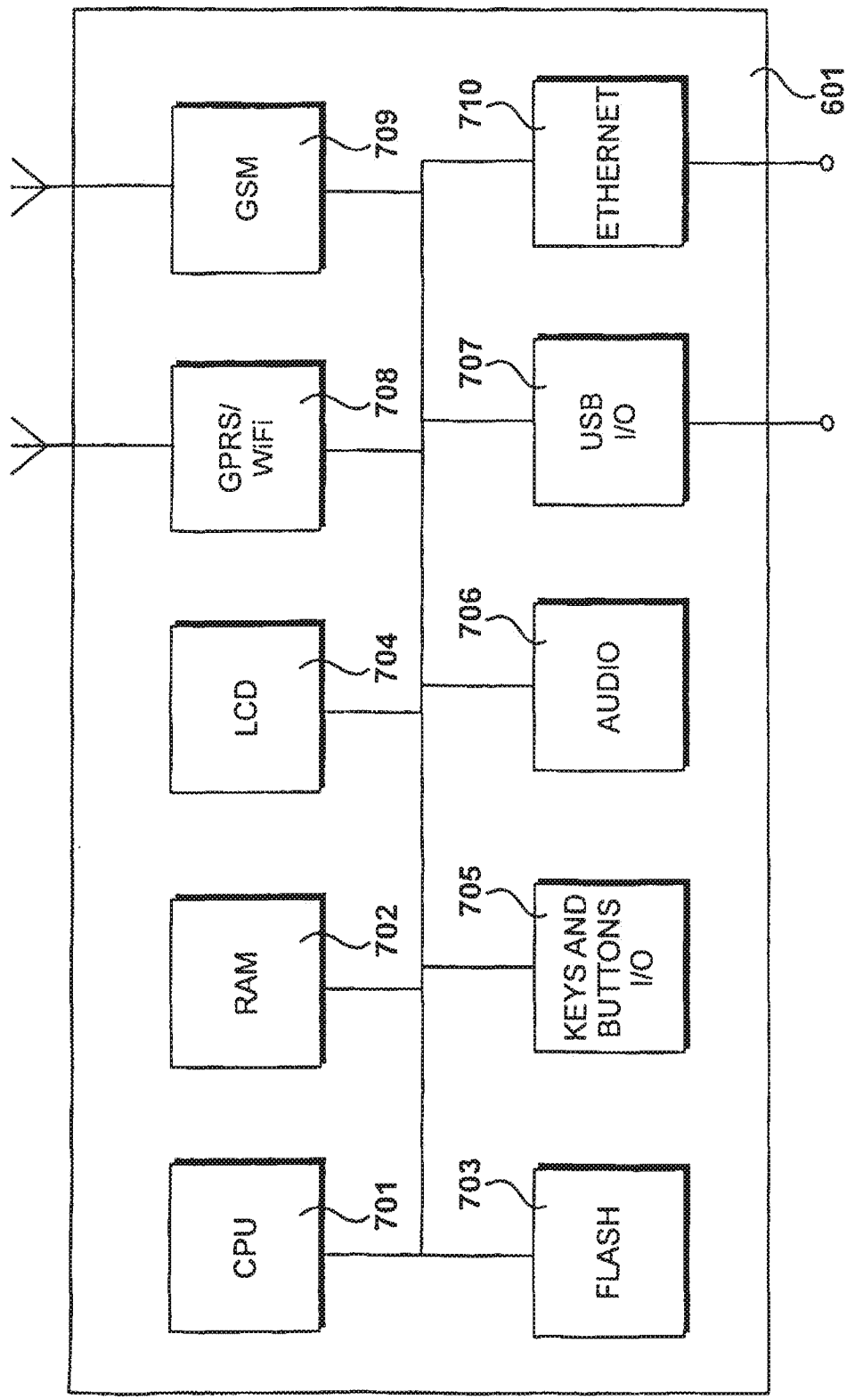
FIG. 7 details the mobile device shown in FIG. 6.

FIG. 7 details mobile device 105 which in this example is a PDA. It includes a CPU 701 with a clock speed of 400 megahertz (MHz) with memory 702 being provided by 64 megabytes (MB) of RAM. 256 MB of nonvolatile FLASH memory 703 is provided for program and data storage. Liquid crystal display 601 is used to display information to the user. Input/output 705 processes the input of the keys and buttons 602 while audio input/output 706 provides a microphone and speaker interface for use with the telephone facility. Universal Serial Bus (USB) input/output 707 is used to connect the PDA to another computer, or to the Internet 110 via a wired connection. GPRS/WiFi connection 708 and GSM connection 709 enable the PDA to connect to wireless networks, while Ethernet card 710 enables it to connect to a wired network, for example via a docking station on a computer.

FIG. 8

Figure 8:
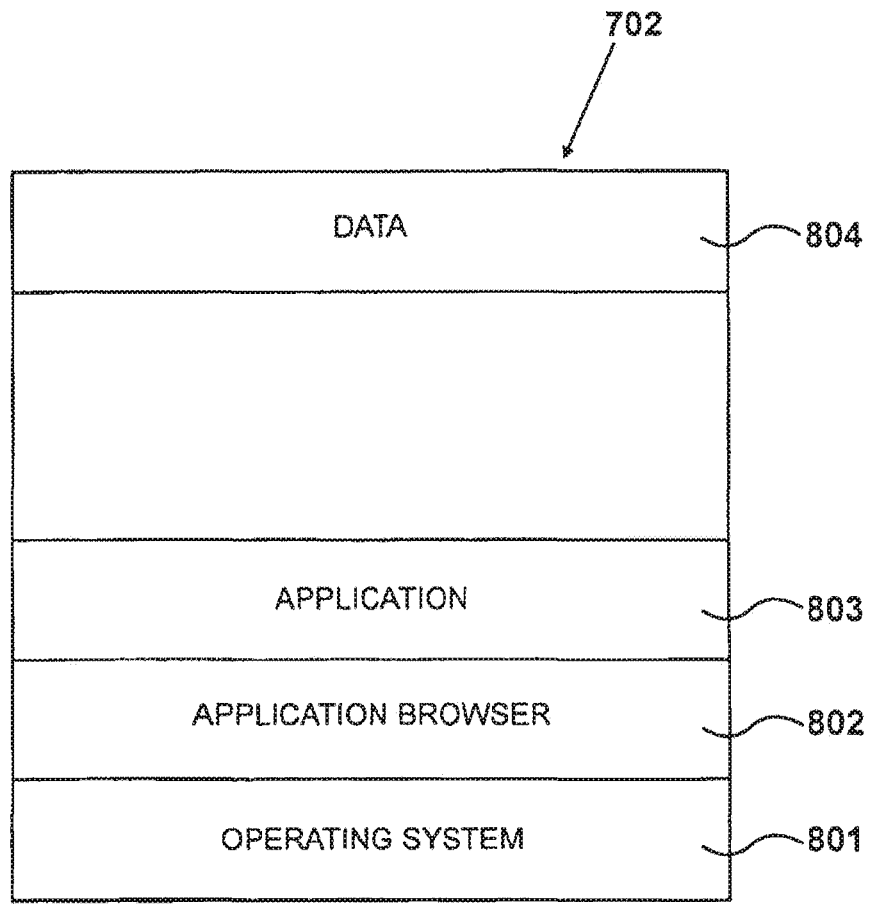
FIG. 8 illustrates the contents of the memory shown in FIG. 7.

FIG. 8 illustrates the contents of memory 702 of device 105. An operating system 801 provides overall functionality for the device and application browser 802 communicates with online system 102 to list and obtain available applications. Application 803 is currently being downloaded and displayed on a page-by-page basis from application server 503. More than one application can be accessed at one time and application browser 802 provides functionality to switch between them.

Memory 702 also contains application data 804 used by application 803, such as undisplayed content data or media data and cached layout data, and other data 805 is used by operating system 801 and application browser 802.

FIG. 9

Figure 9:
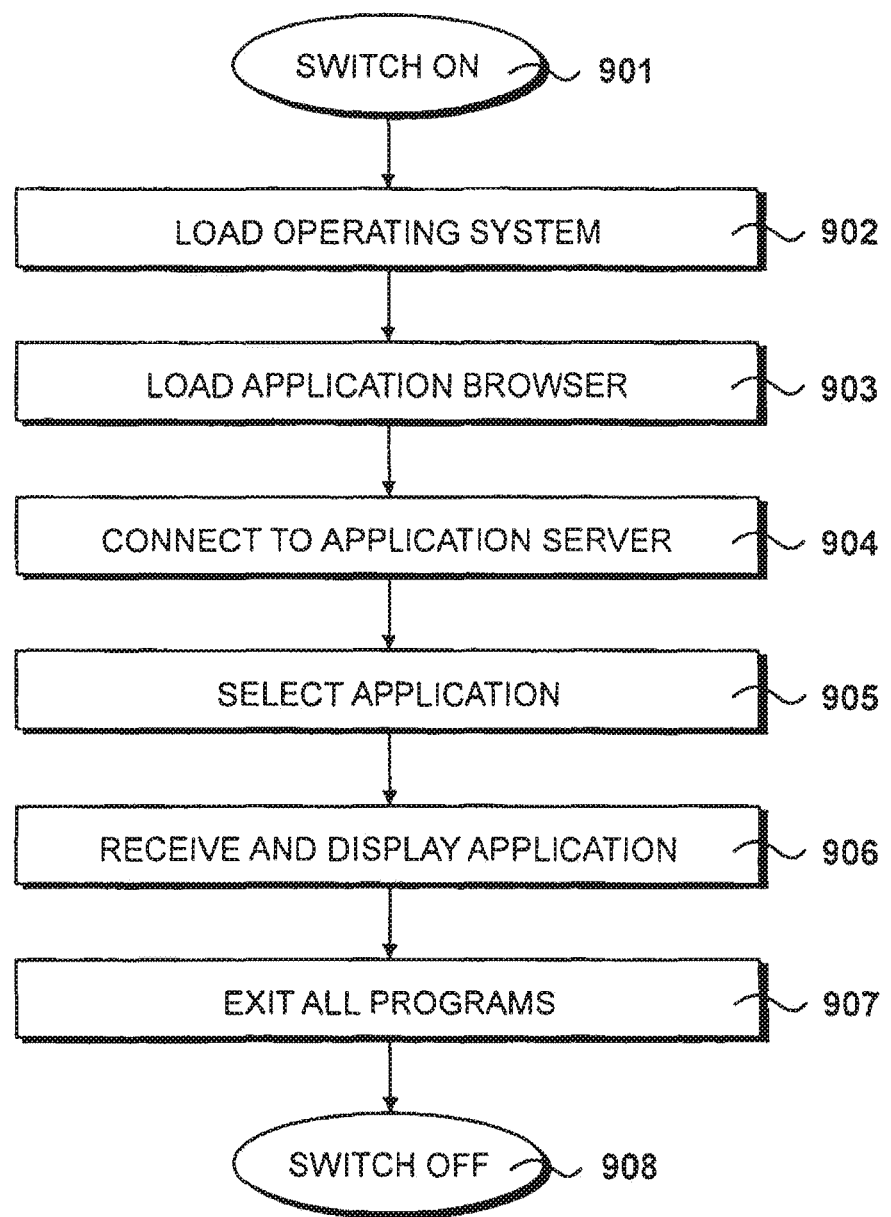
FIG. 9 details steps carried out during operation of the mobile device shown in FIG. 6.

FIG. 9 details steps carried out during the operation of mobile device 105. At step 901 the device is switched on and at step 902 the operating system 801 is loaded, while at step 903 application browser 802 is loaded. At step 904 the application browser connects to application server 503 and the user selects an application he wishes to view at step 905, for example by using a bookmark or selecting from a list.

At step 906 the application is received and displayed on a page-by-page basis. Thus the device is first delivered the home page of the application and any further pages are delivered as the user browses to them. Alternatively, pages that the user may be expected to require can be delivered and cached. At step 907 all programs are exited before the device is switched off at step 908.

FIG. 10

Figure 10:
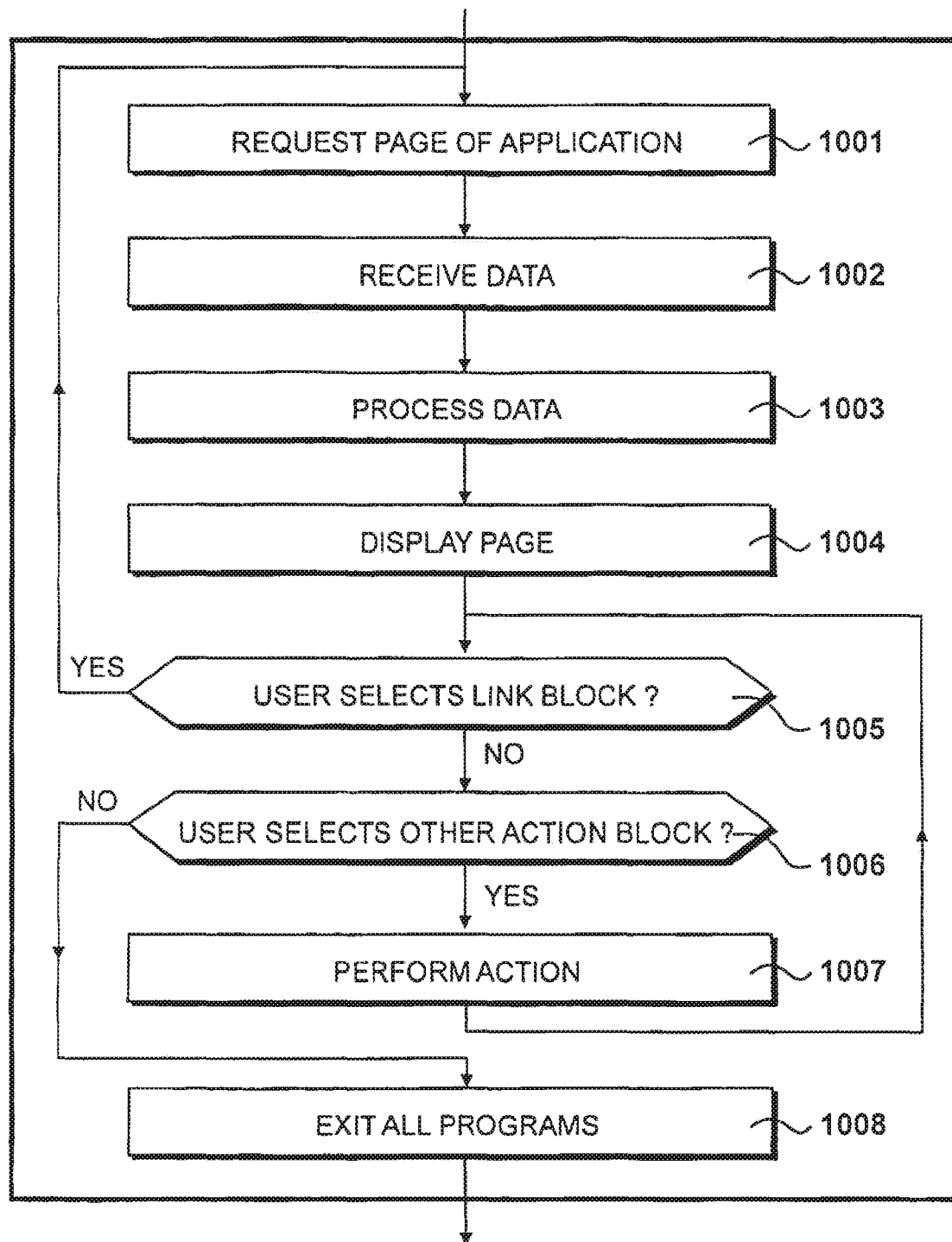
FIG. 10 details steps carried out during FIG. 9 to receive and display an application.

FIG. 10 details step 905 at which the mobile device 105 receives an application from application server 503 and displays it on LCD screen 601. At step 1001 a page of the application is requested, which in the first instance is the home page. At step 1002 data relating to this page is received and at step 1003 it is processed so that the page can be displayed at step 1004. At step 1005 a question is asked as to whether the user has selected a block that is a link to another page and if this question is answered in the affirmative control is returned to step 1001 and the next page is requested. When this page is displayed the previous page is held in memory so that it can be easily reloaded if required.

If the question asked at step 1005 is answered in the negative, a further question is asked at step 1006 as to whether the user has selected some other kind of action block. If this question is answered in the affirmative then the action is performed at step 1007 before control is returned to step 1005 to await a further selection by the use. If it is answered in the negative then the user has requested to exit the application and this occurs at step 1008. The user may at any time switch between applications running on application browser 802 without exiting them, subject to memory restrictions on the device.

FIG. 11

Figure 11:
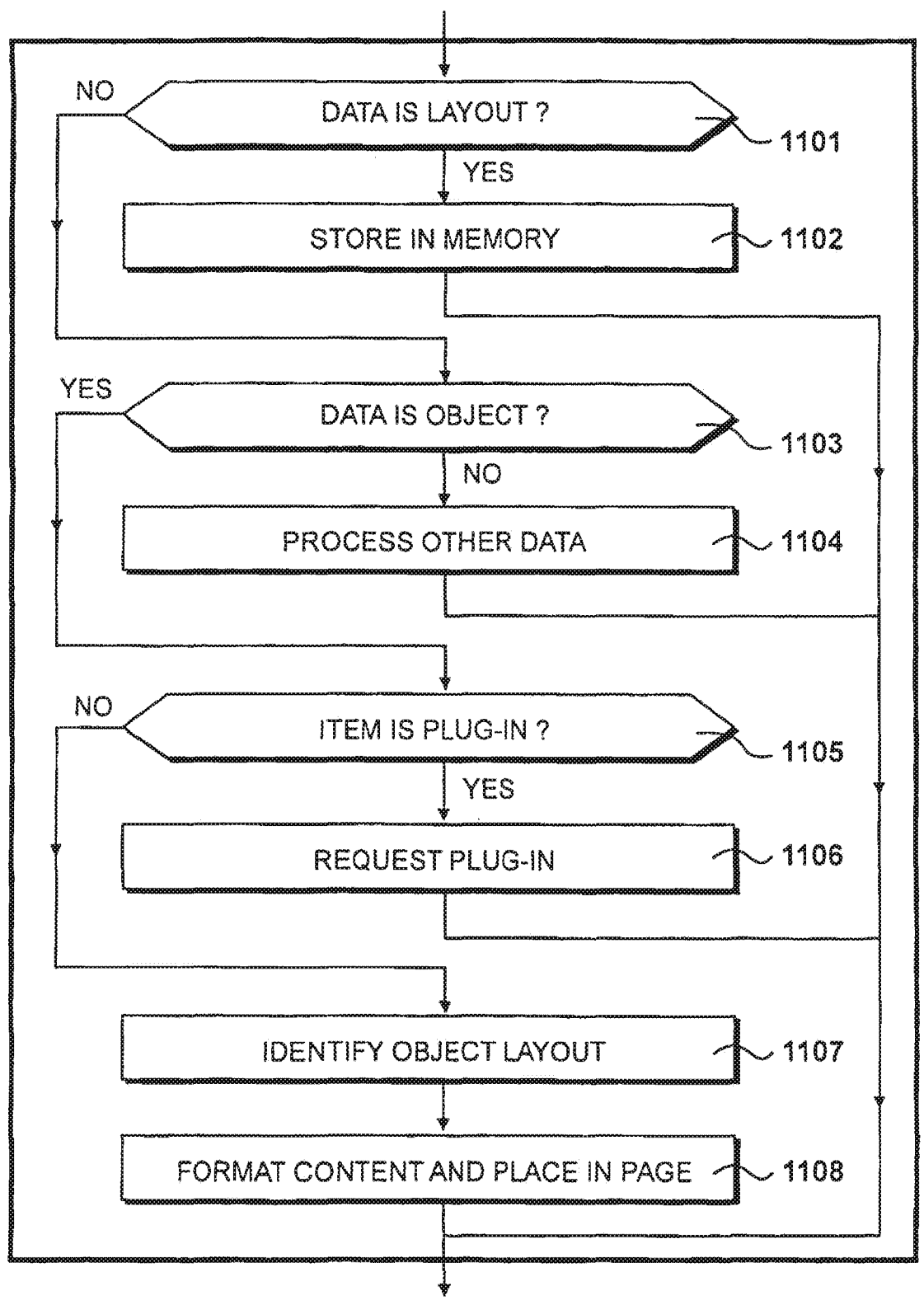
FIG. 11 details steps carried out during FIG. 10 to process received data.

FIG. 11 details step 1003 at which received data is processed so that a page can be displayed. At step 1101 a question is asked as to whether the received data is a layout and if this question is answered in the affirmative the layout is stored in memory to be used as appropriate. If the question is answered in the negative then a question is asked at step 1103 as to whether the data is an object. If this question is answered in the negative then the data is some other data relating to the application and this is processed at 1104. Alternatively, if the question is answered in the affirmative, a further question is asked at step 1105 as to whether the object indicates a plug-in. Plug-ins are processed separately from other items on the page and once they have been positioned within a container all their content, layout and style information is delivered on a side feed directly from the plug-in's location, and so if this question is answered in the affirmative the plug-in is requested at step 1106.

If the question is answered in the negative then the object is a container or block, and its layout type is identified at step 1107. The layout data will be stored in memory since it will either have been sent with this object or sent with a previous object that has the same layout and style. Thus at step 1108 the received object is formatted according to the correct layout data and placed in the page. A question is then asked at step 1109 as to whether more data has been received and if this question is answered in the affirmative control is returned to step 1101 and it is processed. Alternatively, the page is complete and step 1003 terminates.

FIG. 12

Figure 12:
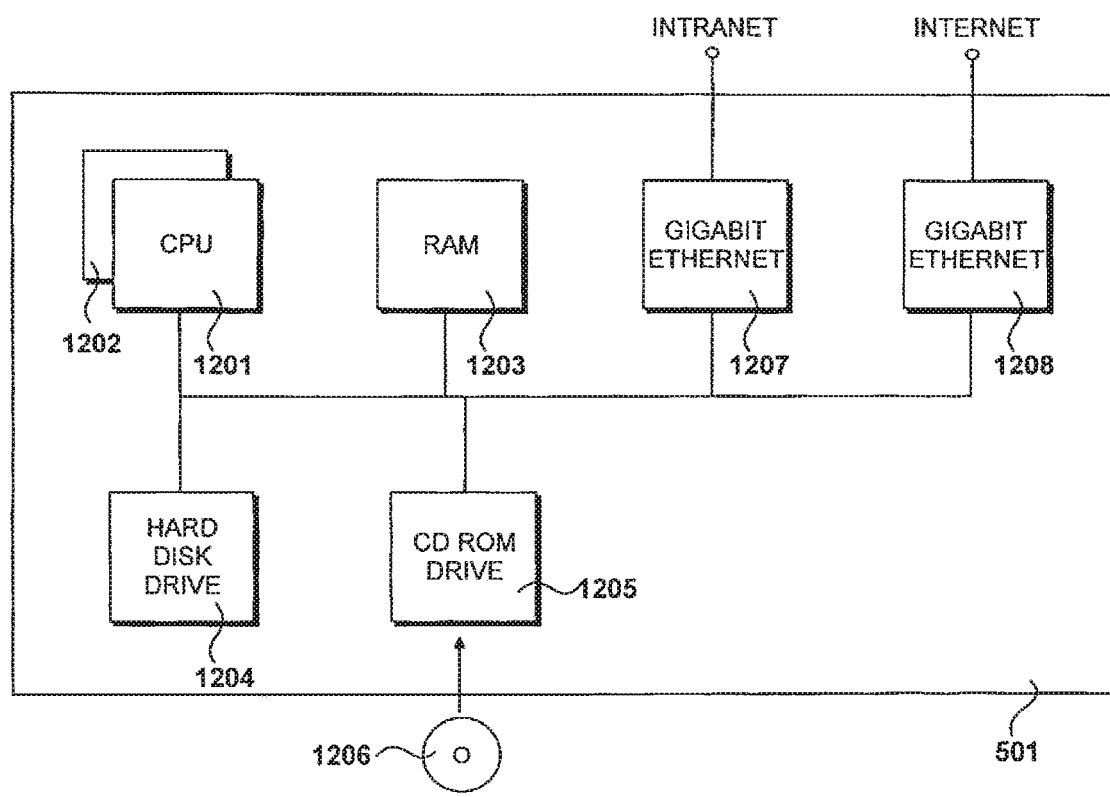
FIG. 12 details the application server shown in FIG. 5.

FIG. 12 shows application server 503. Application repository 501 is similar. It comprises two parallel central processing units (CPUs) 1201 and 1202 having a clock frequency of 3 GHz, a main memory 1203 comprising 4 GB of dynamic RAM and local storage 1204 provided by a 20 Gb-disk array. A CDROM disk drive 1205 allows instructions to be loaded onto local storage 1204 from a CD-ROM 1206. A first Gigabit Ethernet card 1207 facilitates intranet connection, and can also be used for installation of instructions. A second Gigabit Ethernet card 1208 provides a connection to Internet 108.

FIG. 13

The contents of main memory 1203 are illustrated in FIG. 12. Operating system 1301 provides operating system instructions for common system tasks and device abstraction. In this example, a Windows® server operating system is used, but another system providing similar functionality could be used. Content serving applications 1302 include instructions for delivering content to terminals, updating personal details, making transactions, and so on, while content acquisition system 1303 creates applications by combining application templates with profiles, and then combining content data with the application templates. Data 1304 includes session data for each user, buffered messages, and other data used by operating system 1301, content serving application 1302 and content acquisition system 1303.

FIG. 14

Figure 14:
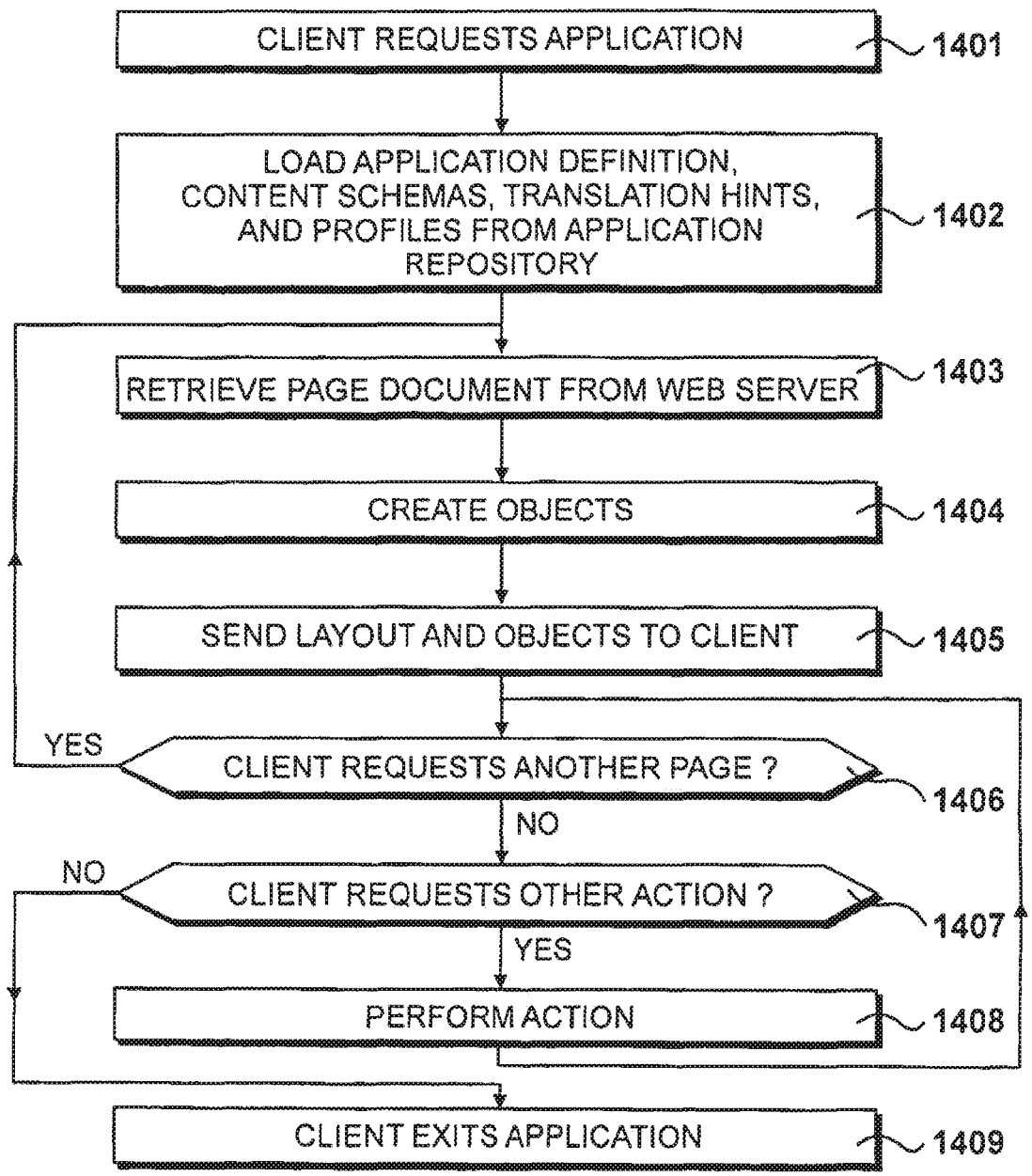
FIG. 14 details steps carried out by the server shown in FIG. 12 to service a request from a client.

FIG. 14 details steps carried out by application server 505 to service a request for an application from a client. At step 1401 a request is received from a mobile device such as device 105. It should already be logged on to the server as a client and thus at step 1402 the user and device profiles can be loaded from the application repository 501, along with the application template 401, comprising the application definition 402, the content integration schemas 403 and the translation hints 404. At step 1403 the document for the requested page, which in the first instance is the application's home page, is retrieved from web server 507 and at step 1404 all of these are combined to create objects. At step 1405 the objects and relevant and layout data are sent to the client for processing and display.

At step 1406 a question is asked as to whether the user has requested another page and if this question is answered in the affirmative control is returned to step 1403 and the relevant page document is retrieved from web server 407, if it has not been already, since some anticipation of the client's requests may be carried out. If the question is answered in the negative then at step 1407 a further question is asked as to whether the user has requested some other action and if this question is answered in the affirmative the action is performed at step 1408, before the process returns to step 1406 to wait for another request. Alternatively, the client exits the application at step 1409.

FIG. 15

Figure 15:
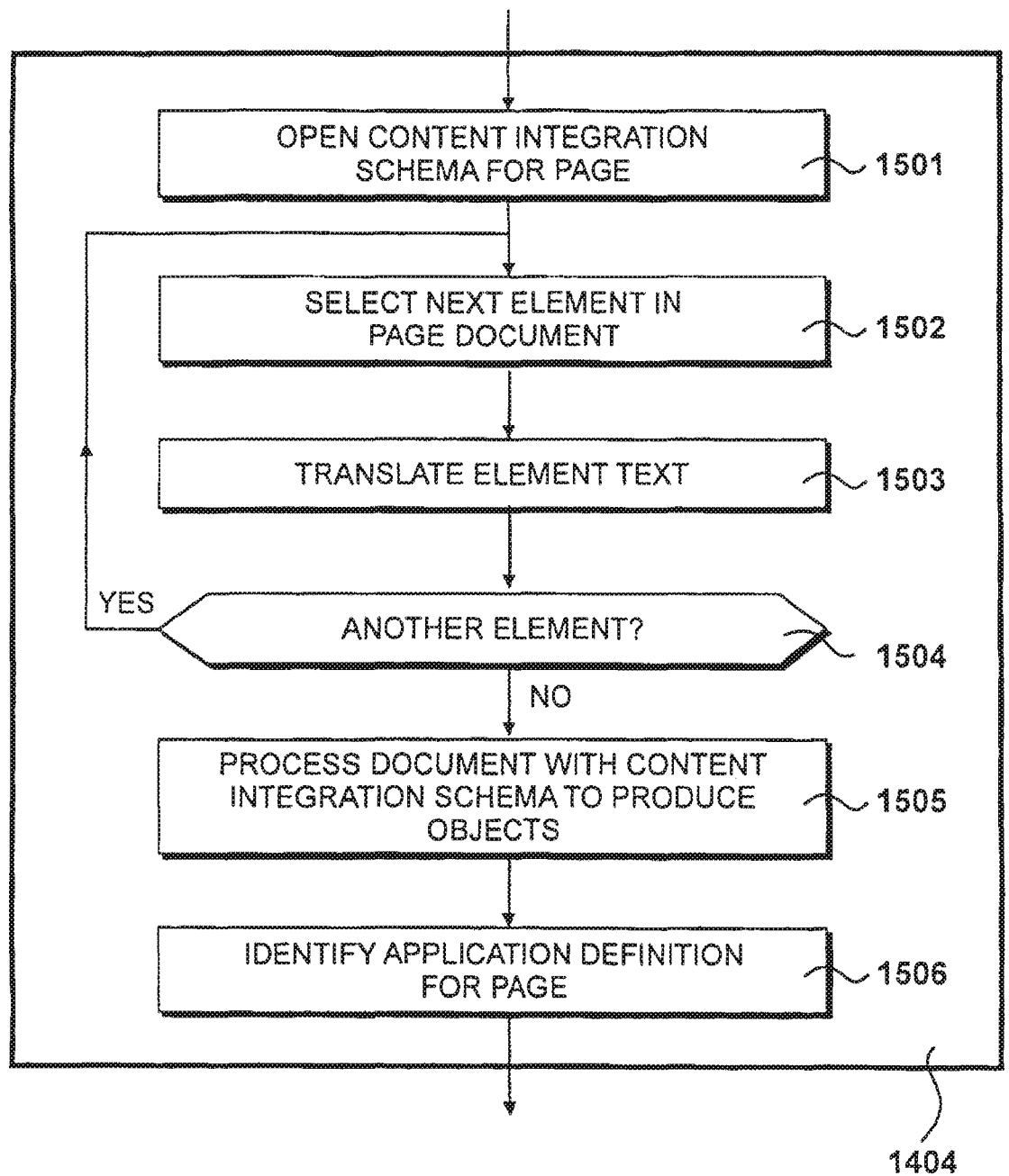
FIG. 15 details steps carried out during FIG. 14 to create objects.

FIG. 15 details step 1404 at which objects are created. This step is carried out by the content acquisition server 1303. At step 1601 the content integration schema for the page document is identified from the document and opened. At step 1502 the first element in the document is selected and at step 1503 this is translated using the content integration schema and the translation hints 404. At step 1504 a question is asked as to whether there is another element in the document and if this question is answered in the affirmative control is returned to step 1502 and the next element is selected.

Alternatively, the question is answered in the negative and the translated document is processed together with the content integration schema to produce a document object model. Finally, at step 1506, the relevant application definition for the page is identified in order to supply layout and style information to the client.

FIG. 16

Figure 16:
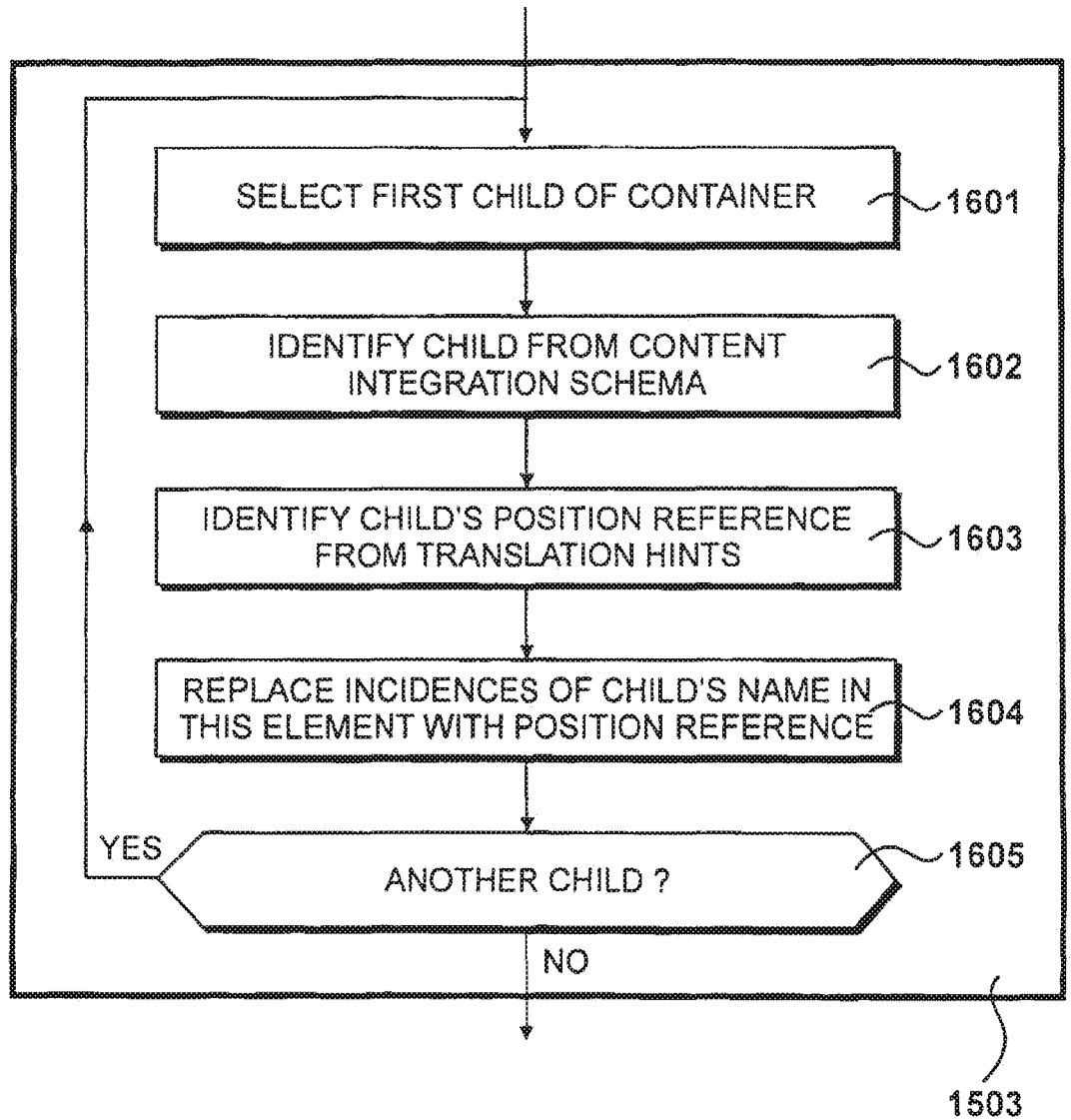
FIG. 16 details steps carried out during FIG. 15 to translate elements in a document.

FIG. 16 details step 1503 at which the text in an element in a page document is translated. At step 1601 the first child of the element is selected and at step 1602 the content integration schema is read to determine whether the child is a container, a block, a plug-in or a slot. At step 1603 the position reference of this child within the element is identified using translation hints 404 and at step 1604 the incidences of the name of the child within the element in the document are replaced with this position reference. For example, the position reference may be slot0. Once the name of the child is replaced with slot0, the application definition for the page will then give the information that slot0 is positioned at the top left hand of the element.

At step 1605 a question is asked as to whether the element has another child and if this question is answered in the affirmative control is returned to step 1601. Alternatively, it is answered in the negative and step 1503 is concluded.

FIG. 17

Figure 17:
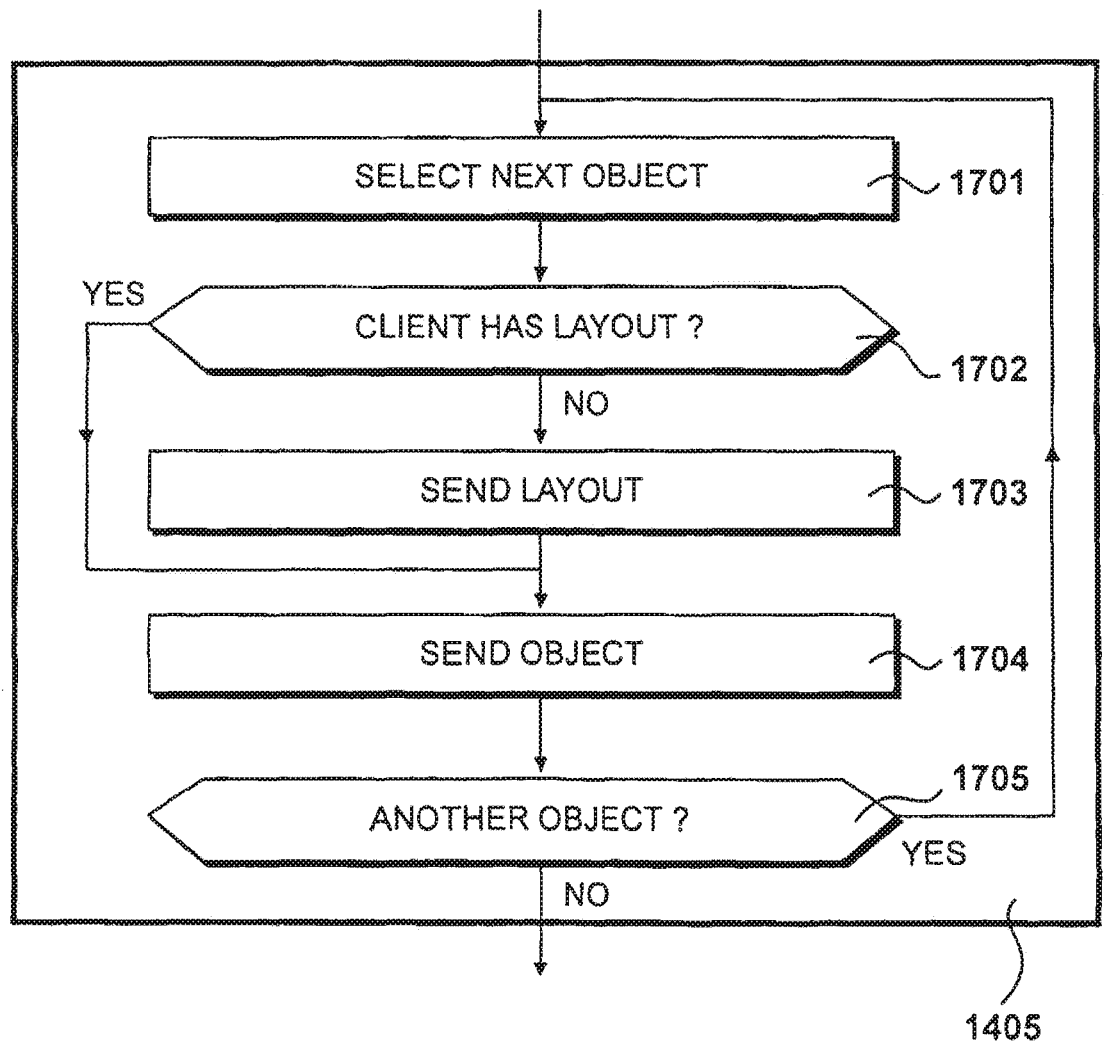
FIG. 17 details steps carried out during FIG. 14 to send data to a client.

FIG. 17 details step 1405 at which the objects and their layouts are sent to the client. At step 1701 the first object to be sent is selected and at step 1702 a question is asked as to whether the client already has the layout for that type of element. For example, the element might have a layout named "mainstory2" and if an object representing an element that also has that layout has already been sent to the client then the layout will not be sent again. Thus, if the question asked at step 1702 is answered in the negative, then the layout is sent at step 1703, whereas this step is skipped if it is answered in the affirmative. At step 1704 the object itself is sent and at step 1705 a question is asked as to whether there is another object to be sent. If this question is answered in the affirmative control is returned to step 1701 while if it is answered in the negative step 1405 is concluded and the whole page has been sent to the client.

FIG. 18

Figure 13:
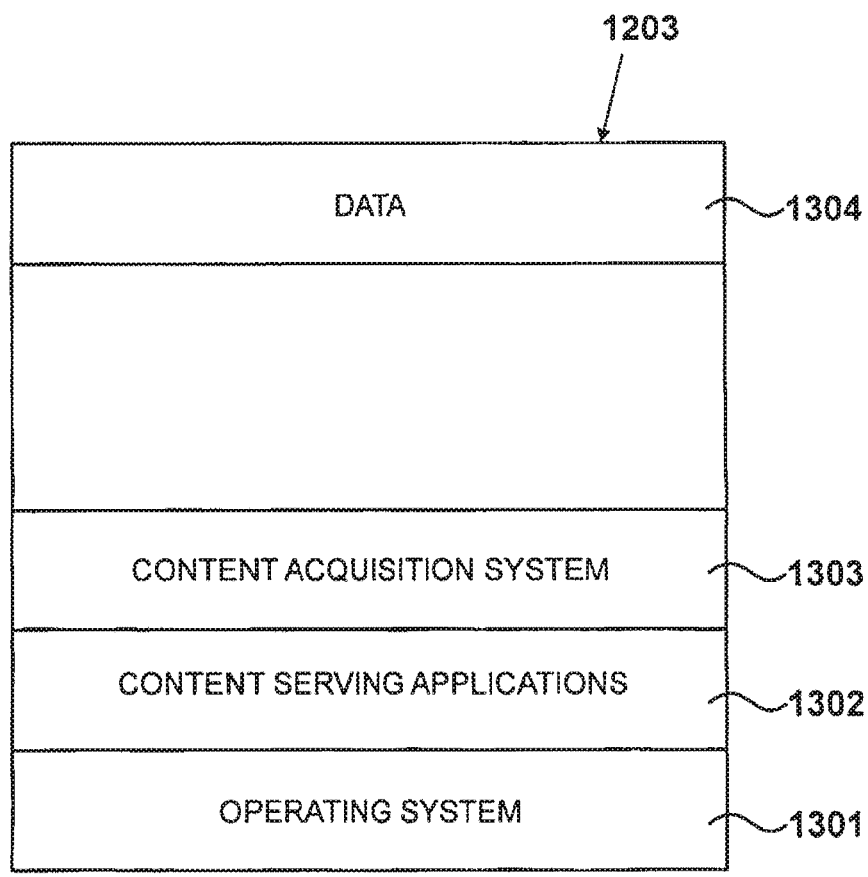
FIG. 13 illustrates the contents of a memory shown in FIG. 12.
Figure 18:
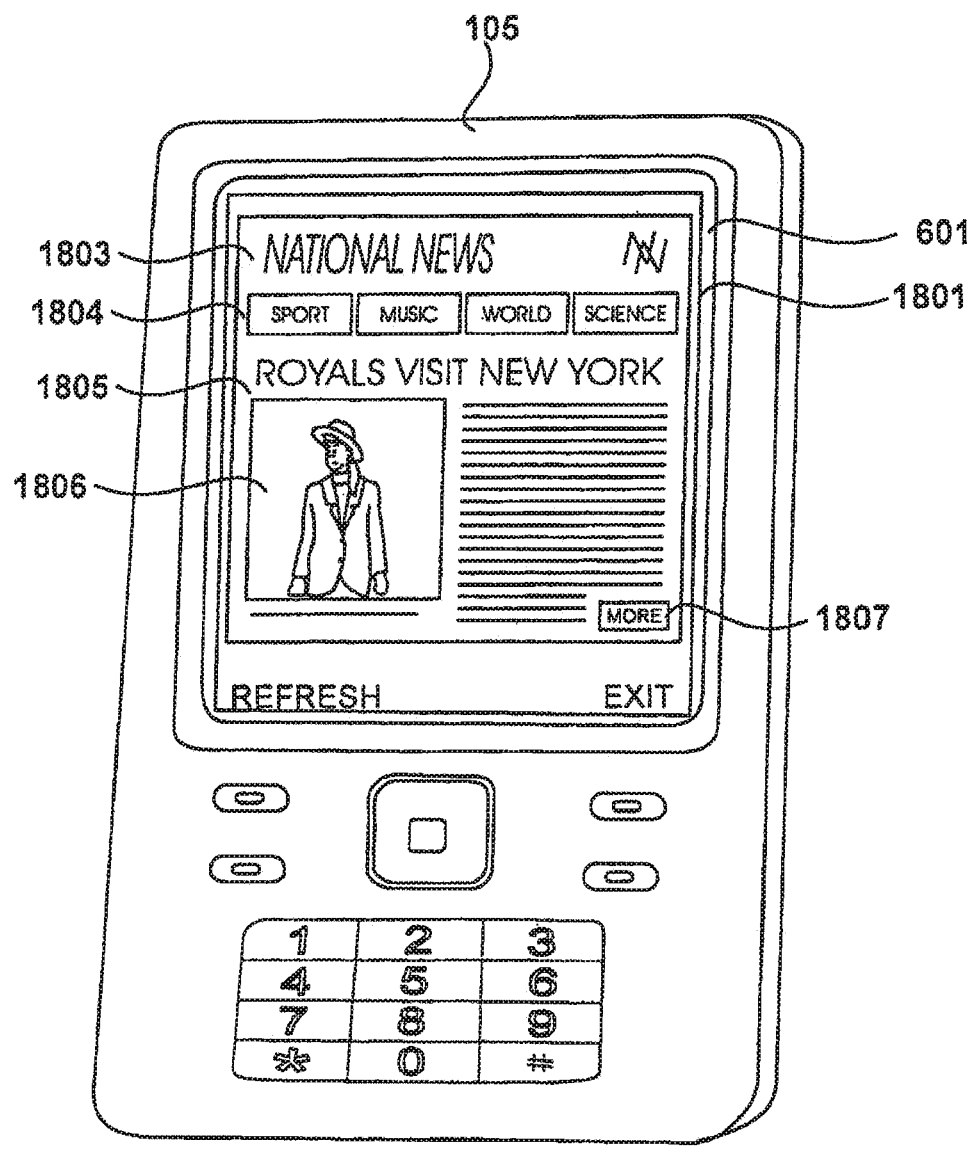
FIG. 18 illustrates the mobile device shown in FIG. 6 having received and displayed an application.

FIG. 18 shows mobile device 105 displaying the application that was being designed in FIG. 2, having requested and received it from application server 503. The home page 1802 of the application 1801 is shown. It can be seen that this application is a news application and it carries at the top a banner 1803 with the application's name. Below that at 1804 are four buttons indicating sub-categories of news and below that at 1805 is a main story, including an image 1806 and a "more" button at 1807. It can be seen on comparison with FIG. 13 that the banner corresponds with block 306, the sub-category buttons correspond with blocks 308 to 311, the main story corresponds to container 304, and so on. However, it may be noted that the page size shown in FIG. 3 is larger than the available display of LCD 601, and so, in accordance with the device profile, content acquisition server 803 has generated a template that is slightly smaller than the page shown in FIG. 3 but fits on the device 105. This has been achieved by removing one of the slots from each of blocks 308 to 311 and reducing the amount of space available to block 304.

The resulting document template has been combined with data from web server 507, including the day's main news story, and delivered to the device.

The invention claimed is:

1. A method, comprising:
   receiving a request for an application from a device over a network connection;
   generating objects for a page of the application, the objects representing a hierarchy of nested elements within the page of the application, wherein each object of the objects corresponds to an element within the page of the application and includes:
      data for the page of the application,
      an identification of its position within the hierarchy of nested elements within the page of the application, and
      an identification of its element type;
   providing the objects to the device;
   providing layout data for the element types corresponding to the objects for the page of the application, the layout data including layouts corresponding to an element type of the element types, and
   the provided objects and layout data allowing the device to create the page of the application for display by determining the objects according to the layout data for the element types corresponding to the objects by:
      determining, for each object of the objects, an element type based on the identification of element type contained in the each object and a layout type corresponding to the element type for the each object;
      formatting the each object according to the layout type for the each object in the layout data; and
      placing the each object of the objects in accordance with the identification of its position within the hierarchy of nested elements to produce the page of the application.

2. The method of claim 1, wherein the page is defined by an application template.

3. The method of claim 1, wherein the hierarchy of nested elements includes a page container, representing a first level of nesting in the hierarchy.

4. The method of claim 3, wherein the hierarchy of nested elements includes a block, representing a second level of nesting in the hierarchy.

5. The method of claim 1, wherein the layout data defines layout and styles for each container type used in the application.

6. The method of claim 1, wherein the layout data is adapted to be cached at the device.

7. The method of claim 1, wherein an object indicates a plug-in adapted to cause the mobile device to request content, layout, and style information for the plug-in from a distinct feed source.

8. An online system, comprising:
   a first device in communication with a mobile device, the first device including:
   a processor; and
   a non-transitory computer readable medium comprising instructions,
   wherein the instructions when executed by the processor cause the online system to:
      receive a request for an application from a mobile device over a network connection;
      generate objects for a page of the application, the objects representing a hierarchy of nested elements within the page of the application, wherein each object of the objects corresponds to an element within the page of the application and contains:
         data for the page of the application,
         an identification of its position within the hierarchy of nested elements within the page of the application, and
         an identification of its element type;
      provide the objects to the mobile device;
      provide layout data for the element types corresponding to the objects for the page of the application, the layout data including layouts corresponding to an element type of the element types,
      wherein the objects and layout data provided from the first device are adapted to allow the mobile device to create the page of the application for display by determining the objects according to the layout data for the element types corresponding to the objects by:
         determining, for each object of the objects, an element type based on the identification of element type contained in the each object and a layout type corresponding to the element type for the each object;
         formatting the each object according to the layout type for the each object in the layout data; and
         placing the each object of the objects in accordance with the identification of its position within the hierarchy of nested elements to produce the page of the application.

9. The online system of claim 8, wherein the page is defined by an application template.

10. The online system of claim 8, wherein the hierarchy of nested elements includes a page container, representing a first level of nesting in the hierarchy.

11. The online system of claim 10, wherein the hierarchy of nested elements includes a block, representing a second level of nesting in the hierarchy.

12. The online system of claim 8, wherein the layout data defines layout and styles for each container type used in the application.

13. The online system of claim 8, wherein the layout data is adapted to be cached at the device.

14. The online system of claim 8, wherein an object indicates a plug-in adapted to cause the mobile device to request content, layout, and style information for the plug-in from a distinct feed source.

15. A non-transitory computer readable medium, comprising instructions for:
   receiving a request for an application from a device over a network connection;
   generating objects for a page of the application, the objects representing a hierarchy of nested elements within the page of the application, wherein each object of the objects corresponds to an element within the page of the application and includes:
      data for the page of the application,
      an identification of its position within the hierarchy of nested elements within the page of the application, and
      an identification of its element type;
   providing the objects to the device;
   providing layout data for the element types corresponding to the objects for the page of the application, the layout data including layouts corresponding to an element type of the element types, and
   the provided objects and layout data allowing the device to create the page of the application for display by determining the objects according to the layout data for the element types corresponding to the objects by:
- determining, for each object of the objects, an element type based on the identification of element type contained in the each object and a layout type corresponding to the element type for the each object;
- formatting the each object according to the layout type for the each object in the layout data; and
- placing the each object of the objects in accordance with the identification of its position within the hierarchy of nested elements to produce the page of the application.

16. The non-transitory computer readable medium of claim 15, wherein the page is defined by an application template.

17. The non-transitory computer readable medium of claim 15, wherein the hierarchy of nested elements includes a page container, representing a first level of nesting in the hierarchy.

18. The non-transitory computer readable medium of claim 17, wherein the hierarchy of nested elements includes a block, representing a second level of nesting in the hierarchy.

19. The non-transitory computer readable medium of claim 15, wherein the layout data defines layout and styles for each container type used in the application.

20. The non-transitory computer readable medium of claim 15, wherein the layout data is adapted to be cached at the device.

21. The non-transitory computer readable medium of claim 15, wherein an object indicates a plug-in adapted to cause the mobile device to request content, layout, and style information for the plug-in from a distinct feed source.

* * * * *